DETECTION OF TOO MANY OR TOO FEW CHARACTERS

Filed Dec. 15, 1966 2 Sheets-Sheet 1

INVENTOR: ALFRED CUTAIA
BY Homer L. Kneal
AGENT 3,525,074
Patented Aug. 18, 1970

3,525,074

DETECTION OF TOO MANY OR TOO FEW CHARACTERS

Alfred Cutaia, Rochester, Minn., assignor to International Business Machines Corporation, Armonk, N.Y., a corporation of New York Filed Dec. 15, 1966, Ser. No. 602,016
Int. Cl. G06k *5/00, 9/10*
U.S. Cl. 340—146.3 6 Claims

ABSTRACT OF THE DISCLOSURE

A scan counter and a segmentation (end of character) latch are used to detect deviations per character of the actual scan count from expected scan counts. An up-down counter accumulates the total difference from deviations for all the characters scanned. The total difference is compared with a tolerance factor and if the difference exceeds the tolerance factor an error is indicated. A second implementation counts the number of characters detected and multiplies this number by the character pitch (expected scans per characters). The product is subtracted from the actual scan count. If the difference between actual scan count and the product exceeds the tolerance factor, an error is indicated.

BACKGROUND OF THE INVENTION

My invention relates to detecting errors in character recognition systems. More particularly, I have invented apparatus for detecting when a character reader detects too many or too few characters in a field of characters scanned.

Today, many character readers have the capability of indicating errors when the character reader sees a pattern but cannot identify it as a character. These errors are due to the poor quality of printing which causes characters to be misregistered, to be touching, to be smeared, to be too light, or to contain breaks. Most of the time a character reader will simply not be able to identify the badly printed character and will indicate an error. However, a problem arises in that some of the time, the printing will be so bad or the operation of the character reader is such that the character reader fails to even indicate an error. For example, the reader may overlook a character and mistakenly indicate a blank. The reader may improperly identify a smear as a valid character. Also the character reader may improperly identify two characters as a single character or a single character as two characters. These are just a few examples where the character reader may represent as true output information what is in fact information containing errors.

SUMMARY OF INVENTION

It is an object of my invention to reduce the amount of erroneous information from character readers by detecting when they have read too many or too few characters in a character field.

It is an other object of my invention to detect character recognition reading errors by determining when the difference between the actual scan count of characters and expected scan count of characters exceeds a tolerance factor.

It is another object of my invention to detect the deviation of actual scan count from expected scan count per character and to accumulate these deviations and indicate an error if the total deviation exceeds a tolerance factor.

It is another object of my invention to count the number of characters detected and therefrom calculate an expected scan count for characters detected so that an error signal may be generated if the difference between the actual scan count and expected scan count exceeds a tolerance factor.

In accordance with the above objects my invention is accomplished by detecting the difference between the actual scan count and the expected scan count for the number of characters detected and by generating an error signal if the difference exceeds a tolerance factor. The difference detecting may be accomplished by detecting deviations of actual scan count from character pitch for each character and then accumulating all the deviations to obtain the total difference figure. Alternatively, difference detecting may be accomplished by estimating the total number of scans required for the number of characters scanned and taking the difference between the total expected scan count and the total actual scan count.

My invention adds greatly to the reliability of character recognition systems in that it detects error conditions previously not detected. The advantage of my invention is that a character reader equipped with it will indicate an error when what appears to be a valid character field actually ocntains an error. Previous character readers without my invention would feed erroneous recognition data to a utilization device such as a computer without error indication because the reader believed the characters to be correct. My invention reduces the amount of erroneous information sent out by a character reader by detecting error conditions previously not detected. The foregoing and other objects, features and advantages of the invention will be apparent from the following more particular description of preferred embodiments of the invention, as illustrated in the accompanying drawings.

DETAILED DESCRIPTION

Figure 4:
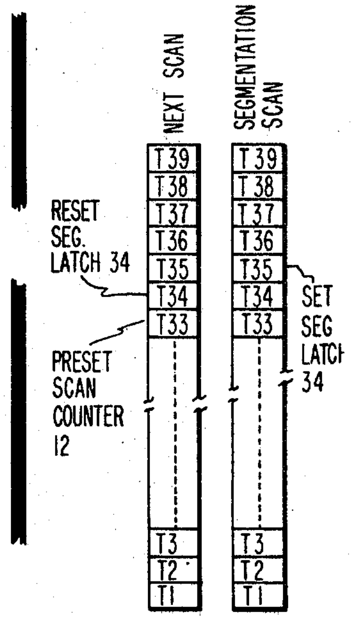
FIG. 4 shows timing intervals of the raster scan used in the disclosed embodiments of the invention.

Before describing in detail the embodiments of the invention, it is necessary to describe the scan pattern that the embodiments were designed for. The scan pattern is referred to herein as raster scan. Raster scan will denote a closely spaced pattern of parallel scans transverse to a line of characters with the scans passing through the characters. Timing intervals in these raster scans are shown in FIG. 4 and will be used in the following described embodiments. Each scan consists of 39 equal time intervals. These time intervals proceed from 1 to 39 for each scan. The first 32 intervals are associated with the scanning beam moving at a slow speed through a character. During the last seven intervals the scanning beam flies at a slight angle to the scan through the character to a new start position. The next scan is made parallel to the preceding scan with a few thousandths of an inch separating the scans. In the following description the letter T will define a pulse which occurs during each of these 39 time intervals. The letter T followed by a numeral defines a pulse which occurs once per scan during the time interval indicated by the numeral. It will be appreciated by one skilled in the art that my invention could be adapted to many different scan patterns. Of course, timing signals which control gating in my apparatus would have to be adapted to the scan pattern chosen.

Figure 1:
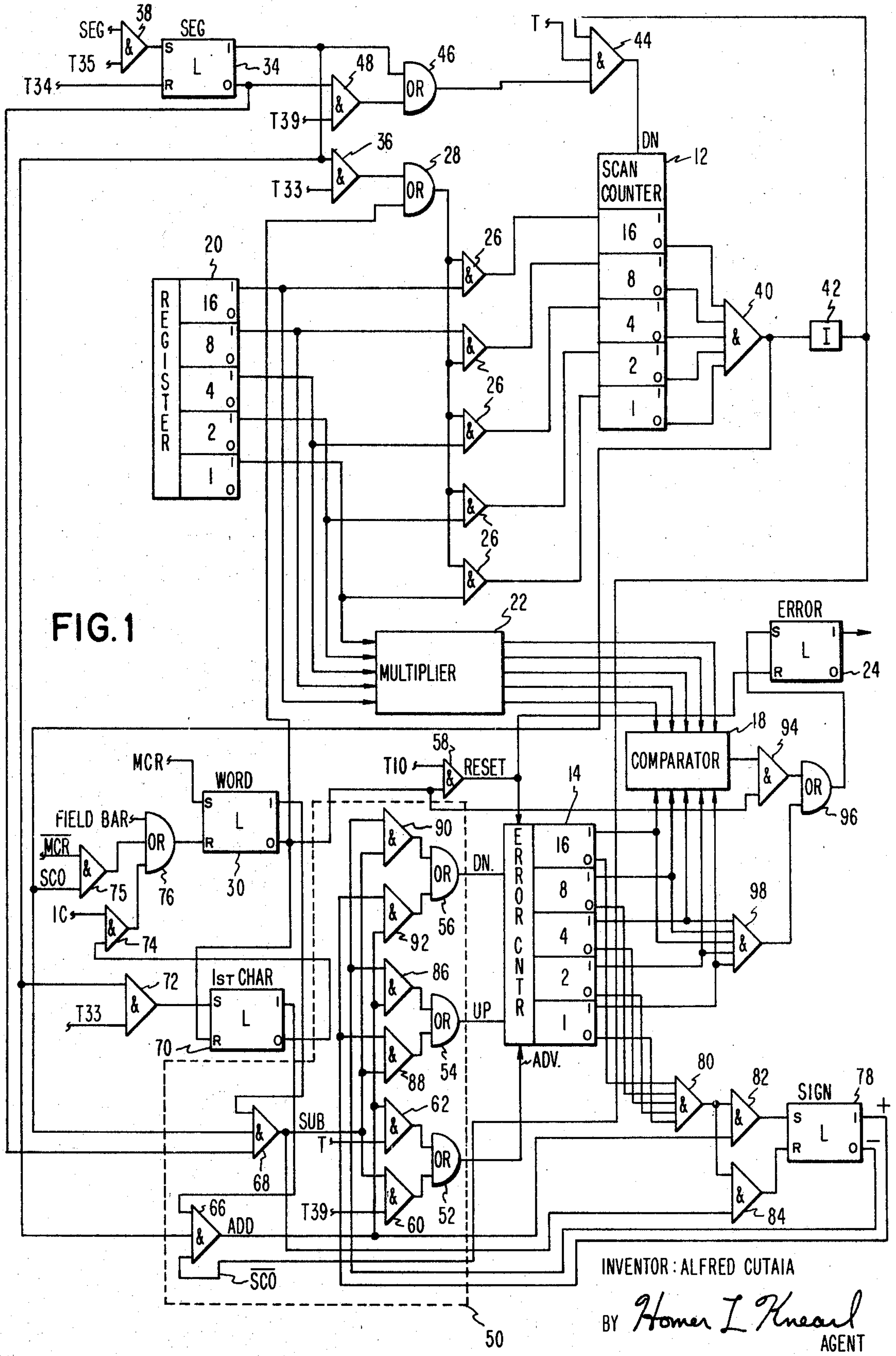
FIG. 1 shows a schematic logic diagram of one embodiment of my invention wherein the deviation of actual scan count from character pitch per character is detected and accumulated so as to detect too many or too few characters.

Referring now to FIG. 1, one embodiment of my invention for detecting too many or too few characters is shown. Scan counter 12 counts the scans per character to achieve an indication of the deviation of the actual scans per character from the character pitch. Deviation indications from scan counter 12 are accumulated in error counter 14 to obtain a total deviation or difference. The total difference stored in error counter 14 at the end of a word is compared with a tolerance factor by comparator 18. The tolerance factor is generally a fraction of the character pitch and is generated by multiplying in multiplier 22 a given fraction times the pitch stored in register 20. At the end of a word if the total difference in error counter 14 exceeds the tolerance factor, comparator 12 has an output signal which is used to set the error latch 24.

Initialy an operator sets the character pitch in pitch register 20. Pitch is the number of scans expected to raster scan from the end of one character to the end of the next character. In effect, it represents the average width of characters plus separation between characters.

The expected scan count in pitch register 20 is gated by AND gates 26 into scan counter 12. The count in pitch register 20 presents the counter 12 to the pitch of the characters. AND gates 26 are gated on by a signal from OR gate 28. OR gate 28 receives a signal from the word latch 30 or the segmentation (end of character) latch 34 via AND circuit 36 which is conditioned at T33 time. In effect, OR gate 28 has an output to condition the AND gates 26 to pass the contents of register 20 to counter 12 if the word latch 30 signals end of a word or the segmentation latch 34 signals end of character.

The end of word signal from word latch 30 is of relatively long duration and effectively holds counter 12 preset until word latch 30 is set indicating the start of a new word. Word latch 30 is set when it receives a Minimum Character Requirement (MCR) signal indicating a character is being scanned. Thus, the word latch 30 is set when the scanning beam initially strikes the first character. Latch 30 remains set until reset at the end of a word.

The end of character signal from segmentation latch 34 is converted into a pulse signal by AND gate 36 and pulse T33. In this way the end of character signal presets counter 12 during a single scan and the counter begins to count again immediately upon the start of the next scan.

The timing with regard to the segmentation latch 34 and AND gate 36 is controlled by time intervals T33, T34 and T35 of the raster scan. At time interval T35 if a segmentation (end of character) signal is present, AND gate 38 sets segmentation latch 34. At time interval T33 during the next scan, AND gate 36 has an output to preset counter 12 to the character pitch. At time interval T34 immediately following the preset of counter 12, the segmentation latch 34 is reset.

After scan counter 12 is preset to the character pitch, it is counted down towards 0, one count for every scan by a signal from AND gate 44. AND gate 40 monitors the 0 output from each stage of counter 12 so as to detect when the counter has reached the value 0. The signal from AND gate 40 is inverted by inverter 42 and fed back to AND gate 44. Therefore, when the counter 12 has reached 0, the output from inverter 42 will be down and AND gate 44 will be inhibited. Scan counter 12 then holds zero count until reset to the character pitch by AND gates 26.

To count down the counter 12 AND gate 44 is hit by a pulse during every T interval and also by a signal from OR gate 46. When a character area is being scanned, OR gate 46 receives a pulse from AND gate 48 once during every scan at interval T39. When a segmentation signal is present, the segmentation latch is set and OR gate 46 receives a constant signal from the segmentation latch 34. Accordingly, AND gate 44 will have an output pulse once during each timing interval or once during each scan depending upon whether or not the segmentation latch is or is not set.

In operation then, scan counter 12 is initially preset to the character pitch by AND gates 26. Segmentation latch 34 is reset or in a zero state, and scan counter 12 is counted down once for each scan. If the scan counter 12 reaches 0 before the segmentation latch 34 is set by a segmentation signal, AND gate 44 is inhibited and the counter 12 holds a 0 count until the segmentation signal again presets the counter 12 via AND gate 36. On the other hand, scan counter 12 may not have reached 0 when the segmentation latch is set by a segmentation (end of character) signal. In this event AND gate 44 passes a pulse to the scan counter during each timing interval T. The scan counter 12 is then counted down to 0 during a single scan. In the next scan the scan counter 12 is preset to the character pitch in preparation for the scanning of the next character. The scan count 0 indication from AND gate 40 and the scan count $\overline{0}$ indication from inverter 42 are used to control gating logic 50.

The purpose of gating logic 50 is to indicate deviation of character width from character pitch for each character. These deviations are then accumulated in error counter 14 so that, at the end of a word, counter 14 has accumulated the difference between the actual scan count for the characters scanned and the expected scan count for characters whose presence has been detected. Error counter 14 accumulates the magnitude of the difference. The counter is advanced by a signal from OR gate 52. The counter operates in a counting up mode in response to a signal from OR gate 54, and the counter operates in a count down mode in response to a signal from OR gate 56. At the end of a word the error counter 14 is reset to 0 by a signal from AND gate 58.

For the error counter 14 to be advanced, OR gate 52 must receive a signal from AND gate 60 or AND gate 62. AND gate 60 generates an output pulse to advance the counter 14 when the scan counter 12 indicates the deviation from pitch is negative. The output pulse from AND gate 60 if it occurs will be during the T39 interval of a scan. AND gate 62 generates an output pulse to advance the error counter 14 when the scan counter 12 indicates the deviation from pitch is positive. Pulses from AND gate 62 occur during every timing interval T of a scan. Positive and negative deviations are detected by AND gates 66 and 68 which monitor the scan count 0 and scan count $\overline{0}$ signals from scan counter 12 and the segmentation signal from segmentation latch 34.

To detect a positive deviation, AND gate 66 monitors the scan count $\overline{0}$ signal from inverter 42. If this signal is present when AND gate 66 receives a segmentation signal from segmentation latch 34, a positive deviation has been detected. In other words, an end of character signal has been received prior to the scan counter 12 reaching a 0 count. This in turn means that the pitch was greater than the character width which is defined herein as positive deviation.

AND gate 66 also receives an input signal from the first character latch 70. One purpose of the first character latch 70 is to prevent AND gate 66 from indicating a positive deviation for the first character. In normal operation it would be expected that the first character of a word would be detected as having a positive deviation because at the start of a word the scan counter 12 is triggered by the start of character rather than the end of previous character. In other words, the MCR signal comes up at the start of the first character and sets word latch 30. Word latch 30 being in a set state no longer causes AND gates 26 via OR gate 28 to preset scan counter 12. Thus for the first character the scan counter 12 starts functioning at the start of the character rather than the end of the previous character. Accordingly, a positive deviation would be expected, and these deviations will only confuse the error detection. Therefore, the first character latch 70 is used to inhibit AND gate 66 to ignore these positive deviations of the first character.

The first character latch 70 is set when AND gate 72 is hit by a segmentation signal and a timing pulse T33. At the same time, scan counter 12 is being reset by the same combination of signals—segmentation signal and timing pulse T33—being applied to AND gate 36. Therefore AND gate 66 is inhibited until the very end of the first segmentation signal. Thus the positive deviation for the first character will not be passed by AND gate 66. If per chance the first character scanned is longer than the pitch, the negative deviations would be detected by AND gate 68 as that gate is not inhibited by the first character latch 70.

Before discussing AND gate 68 it is appropriate to point out that the first character latch 70 has a second purpose other than inhibiting AND gate 66. This second purpose of latch 70 is to re-initialize the system in the event that the first character sensed is an invalid character. This purpose is accomplished by feeding back the 0 output from latch 70 to AND gate 74. AND gate 74 acts through OR gate 76 to reset word latch 30. AND gate 74 generates an output signal when during the scanning of the first character, the recognition apparatus (not shown) indicates an invalid character. Therefore, during the first segmentation latch period, if the recognition apparatus detects an invalid character the word latch 30 is reset which in turn resets the entire system. After the first segmentation latch period, the word latch 30 is not reset by the invalid character signal.

Returning to the gating logic 50, AND gate 68 generates an output signal indicating a negative deviation from the character pitch. A negative deviation means that the character pitch is less than the character area scanned between two segmentation signals. Negative deviation can be detected by noting that scan counter 12 has reached 0 prior to a segmentation signal. Accordingly, AND gate 68 responds to segmentation not present, word present and scan count 0. In other words, AND gate 68 generates an output signal when segmentation latch 34 is not set, when the word latch is set and scan counter 12 has reached 0. This indicates that the character area being scanned is greater than the character pitch, and thus a negative deviation exists for that character.

To summarize the advancing of error counter 14, the counter receives a pulse during every timing interval or during every scan depending upon whether there is a positive or negative deviation respectively. In the event of a positive deviation, AND gate 66 has an output to bias AND gate 62. AND gate 62 then passes a pulse during every time interval T to advance counter 14. Simultaneously, scan counter 12 is being counted down to 0 by a pulse every time interval T via AND gate 44. When scan counter 12 reaches 0, the signal out of inverter 42 drops and AND gate 66 is inhibited. Inhibiting AND gate 66 blocks further advancing pulses to counter 14. The result being that counter 14 has accumulated the magnitude of the positive deviation.

In the event of a negative deviation, counter 14 is advanced by a pulse from AND gate 60. AND gate 60 generates an output pulse during each time interval T39 if a negative deviation is detected by AND gate 68. AND gate 68 shows a negative deviation because the scan counter 12 has reached 0 prior to the segmentation latch 34 being set. Accordingly, during each scan at time interval T39, the error counter 14 is advanced one count via AND gate 60. When the segmentation signal finally arrives to set segmentation latch 34, AND gate 68 is inhibited. Thereby AND gate 60 is inhibited and error counter 14 is no longer advanced. The result is that error counter 14 has accumulated the magnitude of the negative deviation from character pitch.

In order that the error counter 14 may accumulate only the magnitude of the total error from all scans of the characters, it is necessary to know whether the counter 14 should be counted up or down. To make this up or down decision the OR gates 54 and 56 must know what the present sign of the total error is and what the present sign of the deviation is. The present sign of the deviation is readily available from AND gates 66 and 68. The sign of the magnitude stored in the counter 14 is monitored and generated by sign latch 78. The sign latch 78 is gated to indicate a positive magnitude or negative magnitude in counter 14 by AND gates 80, 82 and 84. AND gate 80 monitors counter 14 to detect when the counter is at 0 count. This 0 count indication biases AND gates 82 and 84. If the present deviation is positive when there is a 0 count, sign latch 78 is set to a positive output. If on the other hand the deviation is negative when the error counter is at 0, the sign latch 78 is reset to indicate a negative sign.

To operate the error counter in a count up mode, OR gate 54 monitors the outputs from AND gates 86 and 88. AND gate 86 has an output when sign latch 78 indicates the sign of the magnitude is positive and when AND gate 66 indicates sign of the deviation is positive. AND gate 88 has an output when sign latch 78 indicates the sign of the magnitude is negative and when AND gate 68 indicates the sign of the deviation is negative. Thus, OR gate 54 signals the error counter 14 to count up if the sign of the deviation and the sign of the magnitude in the counter are the same.

To operate the error counter 14 in a count down mode, OR gate 56 monitors AND gates 90 and 92. AND gate 90 has an output when sign latch 78 indicates the sign of the magnitude is positive and when AND gate 68 indicates the sign of the deviation is negative. AND gate 92 has an output when sign latch 78 indicates the sign of the magnitude is negative and when AND gate 66 indicates the sign of the deviation is positive. Thus, the counter 14 is counted down when the sign of the magnitude differs from the sign of the deviation.

In effect, error counter 14 keeps a running total of the magnitude of the difference between actual scans per character and character pitch. This accumulated difference is continuously monitored by comparator 18. As pointed out previously, comparator 18 compares the magnitude of the difference from counter 14 with a tolerance factor calculated on the basis of the character pitch. To review, the tolerance factor is calculated by multiplying in multiplier 22 the pitch from register 20 by a fraction. When the comparator detects that the value in the error counter 14 exceeds the tolerance factor, it supplies an output signal to AND gate 94.

At the end of a word AND gate 94 samples the output from comparator 18. The sampling signal which biases AND gate 94 is the 0 side of word latch 30 which comes up at the end of a word. If at the end of a word the output comparator 18 indicates the error is greater than the tolerance factor, AND gate 94 generates an output pulse which is passed by OR gate 96 to set error latch 24. Alternatively, error latch 24 can be set by an output signal from AND gate 98. AND gate 98 has an output if the error counter 14 reaches maximum capacity. In this event, error latch 24 is automatically set whether or not the end of word has been reached.

Figure 2A:
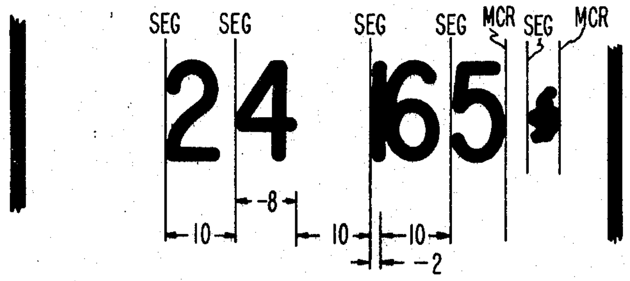
FIG. 2*a* shows a character field wherein the character reader has failed to segment or logically separate the touching characters 1 and 6 but may still recognize one of the characters. My invention detects this error condition by detecting too few characters for the number of scans.
Figure 2B:
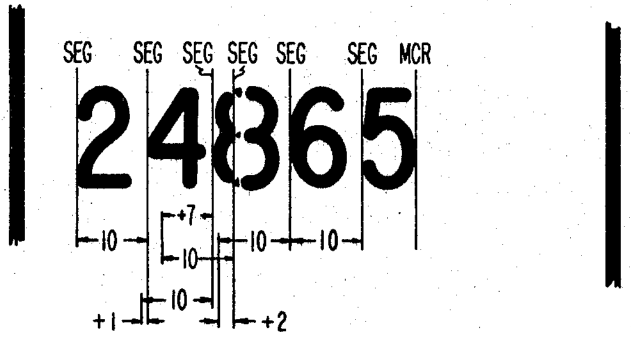
FIG. 2*b* shows a character field wherein the character reader has improperly segmented an 8 so that the reader recognizes a numeral 1 and a numeral 3 instead of an 8. My invention detects this error condition by detecting too many characters for the number of scans.

Reference is now made to FIGS. 2*a* and 2*b* showing some of the error conditions which my invention will detect. Thin vertical bars in these figures indicate the occurrence of MCR or segmentation signals. The raster scan proceeds from right to left so the first error condition in FIG. 2*a* is the smear preceding the character 5. The recognition circuits (not shown) indicate the character detected (the smear) is an invalid character. The apparatus of my invention ignores this invalid character. The second error condition is the touching character condition occurring between the numerals 1 and 6. As shown in FIG. 2*a*, the segmentation apparatus (not shown) has failed to separate the numerals 1 and 6 and instead has segmented after the numeral 1. This failure to segment will cause the apparatus of my invention to indicate an error condition as too few characters will be detected.

My invention as embodied in FIG. 1 would operate on the character field in FIG. 2*a* as follows. When the raster scan strikes the noise smear to the right of the numeral 5, my error detection system is initialized. The MCR signal has caused the word latch 30 to become set. Meanwhile first character latch 70 has remained in a 0 state. The raster scan proceeds across the smear and a segmentation signal occurs at the end of the smear. While the segmentation latch 34 is set and before the T33 timing interval arrives to set the first character latch 70, an invalid character signal will be received by AND gate 74. The invalid character signal is from recognition circuits (not shown) which identify the smear as an invalid character. Since the first character latch is in a 0 state, the invalid character signal is passed by AND gate 74 to reset the word latch 30. When the word latch 30 is reset it holds first character latch 70 reset even though at T33 time AND gate 72 would attempt to set the first character latch. Thus, the detection of the invalid character holds the whole system reset, and the system will not be initialized until the next MCR signal.

When the raster scan first intercepts the numeral 5 in FIG. 2*a*, the next MCR signal is received by the system. Because the first character latch 70 remains in a reset state until the segmentation signal after the numeral 5, the error counter 14 is normally not advanced. In normal operation if the first character (numeral 5 herein) is a correct character and if segmentation occurs at the proper time, it would be expected that a positive deviation would exist. As previously pointed out, the reason for positive deviation is that pitch is based on the distance between segmentation points whereas the first character distance is measured from MCR to segmentation. Thus, AND gate 66 in FIG. 1 is inhibited by the first character latch 70 until after the first segmentation signal. Thereby the error counter 14 is not advanced for the positive deviations detected in the first character. On the other hand if an error condition exists by means of the first character being too long, the AND gate 68 is still operative to detect negative deviations.

In the example of FIG. 2*a* numeral 5 is valid, and first character latch 70 operates to cause the system to ignore the positive deviations of the first character. The segmentation signal at the end of numeral 5 sets the first character latch 70, and thereafter the system monitors both positive and negative deviations. The first character latch remains set until the entire system is reset by a reset signal being applied to word latch 30. After the numeral 5 the raster scan proceeds through the touching numerals 6 and 1. The next segmentation signal occurs after the numeral 1 because the segmentation apparatus (not shown) failed to segment the touching characters. This in turn means that a negative deviation will be detected between the segmentation after the 5 and the segmentation after the 1.

In operation the negative deviation is detected as follows. The pitch register 20 is set to a pitch of 10 because in FIG. 2*a* ten scans should separate two segmentation signals. The count of 10 is passed from the pitch register to the scan counter 12 when the word latch 30 becomes set. Scan counter 12 is then counted down one count for each scan. When the scan counter 12 reaches 0, the segmentation signal has not occurred because of the touching characters. Therefore, the scan count 0 indication from counter 12 and the no segmentation indication from latch 34 bring up AND gate 68 indicating a negative deviation. Thereafter until the segmentation signal is detected, the error counter is advanced one count for each scan via signals from AND gate 60. In the example shown in FIG. 2*a* the negative deviation is 2.

After the numeral 1, the raster scan does not hit another end of character condition until after the numeral 4. The distance between the end of numeral 1 and the end of numeral 4 again represents a negative deviation. This negative deviation is detected as was discussed proviously for the 1–6 touching character situation. However, in this case, the negative deviation amounts to eight scans. These eight scans would be added on to the count in error counter 14 because the negative deviation is in the same direction as the sign of the magntude in the error counter.

The last character in the field, numeral 2, is properly spaced and no deviations are detected. The raster scan then proceeds to the left until AND gate 75 detects a blank character condition. The blank character condition is no MCR signal when the scan counter 12 reaches 0. The word latch 30 is then reset by the blank character signal. The 0 output from the word latch resets the scan counter 12 to the pitch count and at time T10 resets the error counter 14. Prior to time T10 the 0 output from word latch 30 is used to gate out the signal from comparator 18. Comparator 18 will have an output if the magnitude of the total difference—10 for the example in FIG. 2*a*—is greater than the tolerance factor supplied by multiplier 22. In the example shown it is assumed that the multiplier fraction is six-tenths so that the tolerance factor applied to comparator 18 is six. Ten being greater than six the comparator does have an output when the word latch 30 is reset. This output signal passes through AND gate 94 to set error latch 24 thereby indicating an error condition. Error latch 24 is then reset at time T10 when error counter 14 is reset.

As just pointed out the multiplier fraction was six-tenths. This is only an example and any fraction or numeral could be chosen. The choice of course controls the tolerance factor and thus the sensitivity of the error detection. It is desirable to adjust the multiplier fraction or numeral according to character pitch, length of word, etc.

FIG. 2*b* shows another example of an error condition in which case my invention detects too many characters and indicates an error. The error depicted in FIG. 2*b* is shown with regard to the middle character which should be interpreted as an 8. However, an improper segmentation signal occurs due to poor printing quality and the 8 is split into a numeral 3 and a numeral 1. My invention detects this error as follows.

Numerals 5 and 6 in FIG. 2*b* are scanned and no deviation is detected. However, when numeral 8 is scanned an early segmentation causes an error which my invention detects as a positive deviation. As previously discussed, counter 12 is advanced to 0 at the rate of one count per scan. However, in FIG. 2*b* the early segmentation signal splits the numeral 8 into two pieces before the scan counter has reached 0. The existence of a segmentation signal with the scan count not 0 causes AND gate 66 to indicate a positive deviation. Error counter 14 and scan counter 12 are then advanced at the rate of one count per time interval until the scan conuter 12 reaches 0. Between the segmentation after the six and the erroneous segmentation in the middle of the 8, two time intervals T are required to advance the scan counter 12 to 0. Thus, a positive deviation of 2 is accumulated in the error counter 14.

As the raster scan proceeds onto the left, another segmentation is immediately detected at the end of the 8.

This will leave the scan counter 12 seven counts short of being at 0. Thus, as previously pointed out the scan counter 12 and the error counter 14 are advanced simultaneously until the scan counter reaches 0. In this case seven counts or seven time intervals will be necessary. Thus, at the end of the 8 the error counter has been advanced to a total positive deviation of 9.

An additional deviation of positive 1 is detected at the end of numeral 4 in the same manner. The numeral 2 is properly positioned after the 4 and no deviation is detected therein. After the numeral 2 the raster scan hits the vertical field bar and word latch 30 is reset.

When word latch 30 is reset the magnitude of the total difference accumulated in error counter 14 is 10. Assuming the reference is still 6 as in the example for FIG. 2*a*, comparator 18 would again have an output when a zero from word latch 30 gates AND gate 94. Therefore error latch 24 is again set indicating an error condition.

Besides detecting improper segmentations as shown in the above two examples for FIGS. 2*a* and 2*b*, the apparatus of my invention will detect any errors which cause the improper substitution or elimination of characters from a word.

Figure 3:
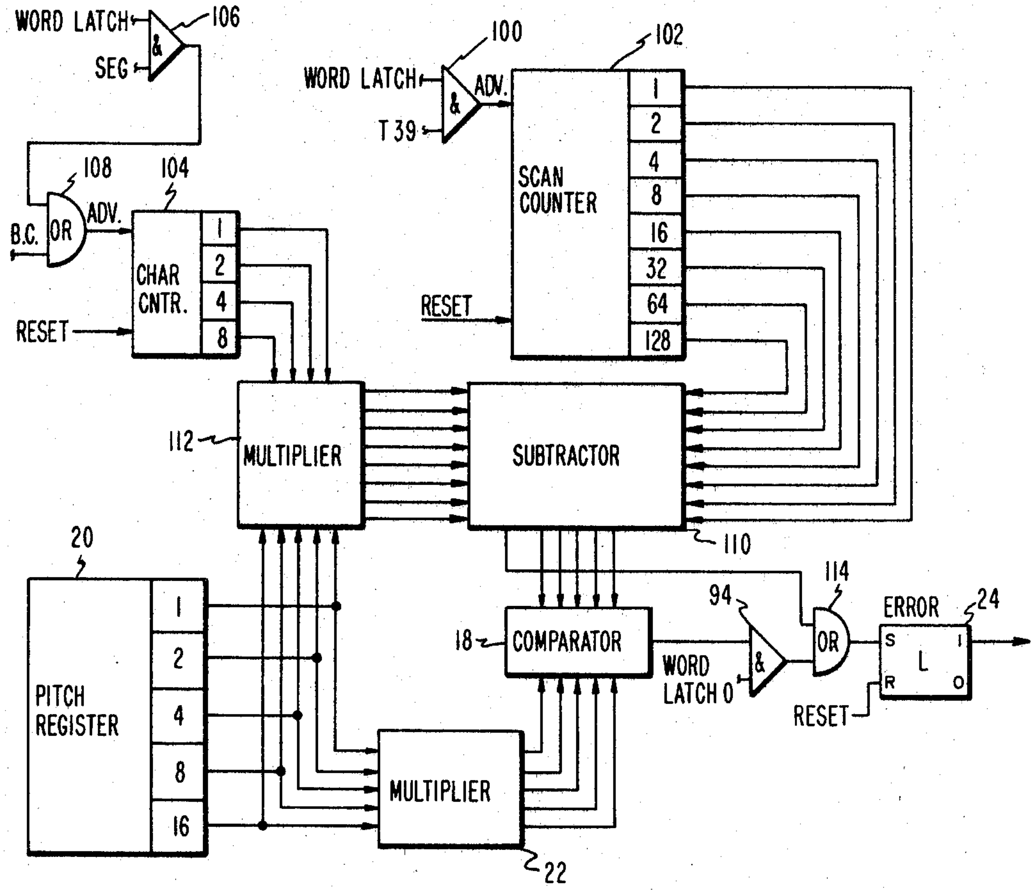
FIG. 3 shows a schematic logic diagram of another embodiment of my invention wherein the expected scan count is calculated by multiplying character pitch by the number of characters detected and then taking the total difference between actual scan count and expected scan count so as to detect too few or too many characters.

An alternative embodiment for my invention is shown in FIG. 3. The fundamentals of the operation in FIG. 3 is that the scan counts instead of being monitored per character are monitored for an entire word. In other words, the embodiment in FIG. 2 detects deviations per character whereas the embodiment in FIG. 3 detects only the final total difference for the entire word.

In operation when the raster scan detects a character, word latch 30 (FIG. 1) is set and thereby AND gate 100 in FIG. 3 generates an output pulse at timing interval T39 during each scan. Therefore, scan counter 102 is advanced one count per scan so long as word latch 30 (FIG. 1) is set. Character counter 104 operates to count the number of characters detected in a word. AND gate 106 is biased to generate an output pulse if word latch 30 is set and if segmentation latch 34 (FIG. 1) is set. Accordingly, AND gate 106 has an output signal once for each character detected while a word is being scanned. These outputs signals are passed through OR gate 108 and counted by character counter 104.

To detect the total difference between actual scans and expected scans, subtractor 110 takes the difference between the quantity in the scan counter 102 and an expected scan count calculated by multiplier 112. Multiplier 112 acts to multiply the character count by the character pitch. Accordingly, the output from subtractor 110 represents the total difference between actual scans for all the characters scanned and expected scans for the number of characters detected. This difference is applied to comparator 18 which operates just as comparator 18 in FIG. 1. Also just as in FIG. 1 comparator 18 receives the tolerance factor from multipler 22 which in turn receives the character pitch from pitch register 20.

An error signal is generated by AND gate 94 in FIG. 3 just as in FIG. 1 when at the end of a word the comparator is sampled and has an output signal. The error indication out of AND gate 94 passes through OR gate 114 and sets the error latch 24. OR gate 114 is also responsive to a direct signal from subtractor 110. This signal from subtractor 110 indicates that the difference is so great that comparison is not necessary. If this signal occurs any time during the word, the error latch 24 is set.

Referring back to the character counter 104, an additional signal to advance the character counter is provided via OR gate 108. This additional signal is the blank character signal. Because the scan counter will count a blank character also, it is necessary to advance the character counter one count when a blank character is detected. In this way the extra scan counts in scan counter 102 for a blank character will be compensated by the expected count from multiplier 112 being advanced by an amount equal to the character pitch.

The system in FIG. 3 is reset by gating error latch 24, scan counter 102 and character counter 104 with the reset signal from AND gate 58 in FIG. 1.

While my invention has been particularly shown and described with reference to preferred embodiments thereof, it will be understood by those skilled in the art that the foregoing and other changes in form and details may be made therein without departing from the spirit and scope of my invention.

What is claimed is:

1. Apparatus for detecting too many or too few characters read by a character recognition system making on the average an expected number of scans through each character, comprising:
- means for receiving a segmentation signal at the termination of each character scanned;
- deviation detecting means responsive to said segmentation signal for detecting the gain or loss per detected character of an actual scan count from an expected scan count;
- accumulating means responsive to said deviation detecting means for accumulating the deviations for a plurality of characters detected so that the difference between the actual number of scans through said detected characters and the expected number of scans for the number of characters detected will appear in said accumulating means; and
- error detecting means responsive to said accumulating means for generating an error signal if said difference exceeds a predetermined tolerance factor.

2. The apparatus of claim 1 wherein said deviation detecting means comprises:
- a register for storing a value representing the expected number of scans per character;
- scan monitoring means presettable for each detected character to the value in said register, said monitoring means modifying the preset value by an amount representing the actual scan count for a detected character so that said monitoring means indicates deviations of the actual scan count from an expected scan count for each detected character.

3. The apparatus of claim 1 wherein said deviation detecting means comprises:
- a register for storing the expected number of scans per character;
- scan counting means for counting down one count for each scan after said register presets said scan counting means for each detected character to the expected number of scans per character so that said scan counting means indicates deviations of the actual scan count from an expected scan count for each detected character.

4. The apparatus of claim 1 wherein said accumulating means comprises:
- a two way counter for accumulating for all the detected characters the magnitude of the deviations detected by said deviation detecting means;
- first gating means responsive to said deviation detecting means for gating said two way counter to count up if the total deviation in said counter is in the same direction as the deviation being detected;
- second gating means responsive to said deviation detecting means for gating said two way counter to count down if the total deviation in said counter is in the opposite direction to the deviation being detected.

5. Apparatus for detecting too many or too few characters read by a character recognition system making on the average an expected number of scans through each character, comprising:
- deviation detecting means for detecting the deviation per detected character of an actual scan count from an expected scan count;
- a two-way counter for accumulating, for all the detected characters, the magnitude of the deviations detected by said deviation detecting means;

first gating means responsive to said deviation detecting means for gating said two-way counter to count up if the total deviation in said counter is in the same direction as the deviation being detected;

second gating means responsive to said deviation detecting means for gating said two-way counter to count down if the total deviation in said counter is in the opposite direction to the deviation being detected; and error detecting means responsive to said two-way counter for generating an error signal if said magnitude is greater than a tolerance factor.

6. Apparatus for detecting too many or too few characters read by a character recognition system making on the average an expected number of scans through each character, comprising:

scan counting means for counting the total number of scans through a plurality of characters scanned;

calculating means for calculating an expected number of scans for the number of characters detected, said calculating means including a register for storing an expected number of scans per character, character counting means for counting the number of characters detected, and multiplying means responsive to said register and to said character counting means for multiplying said expected number of scans per character by the number of characters detected so as to obtain an expected number of scans for the number of characters detected;

arithmetic means responsive to said scan counting means and to said calculating means for taking the difference between the actual total number of scans through said characters scanned and the expected number of scans for the number of characters detected; and error detecting means responsive to said arithmetic means for generating an error signal if said difference is greater than a tolerance factor.

References Cited

UNITED STATES PATENTS

| | | | |
|---|---|---|---|
| 2,910,908 | 11/1959 | Meyer. | |
| 3,049,692 | 8/1962 | Hunt | 340—146.1 |
| 3,246,324 | 4/1966 | Price | 343—7.3 |
| 3,263,216 | 7/1966 | Andrews | 340—146.3 |
| 3,332,065 | 7/1967 | Sekse | 340—146.1 |
| 3,354,455 | 11/1967 | Briggs et al. | 343—7.3 |

MAYNARD R. WILBUR, Primary Examiner

M. K. WOLENSKY, Assistant Examiner

U.S. Cl. X.R.

235—92